July 28, 1942.   L. POGLEIN   2,291,580
REMOVABLE MOLD INSERT
Filed Jan. 10, 1938
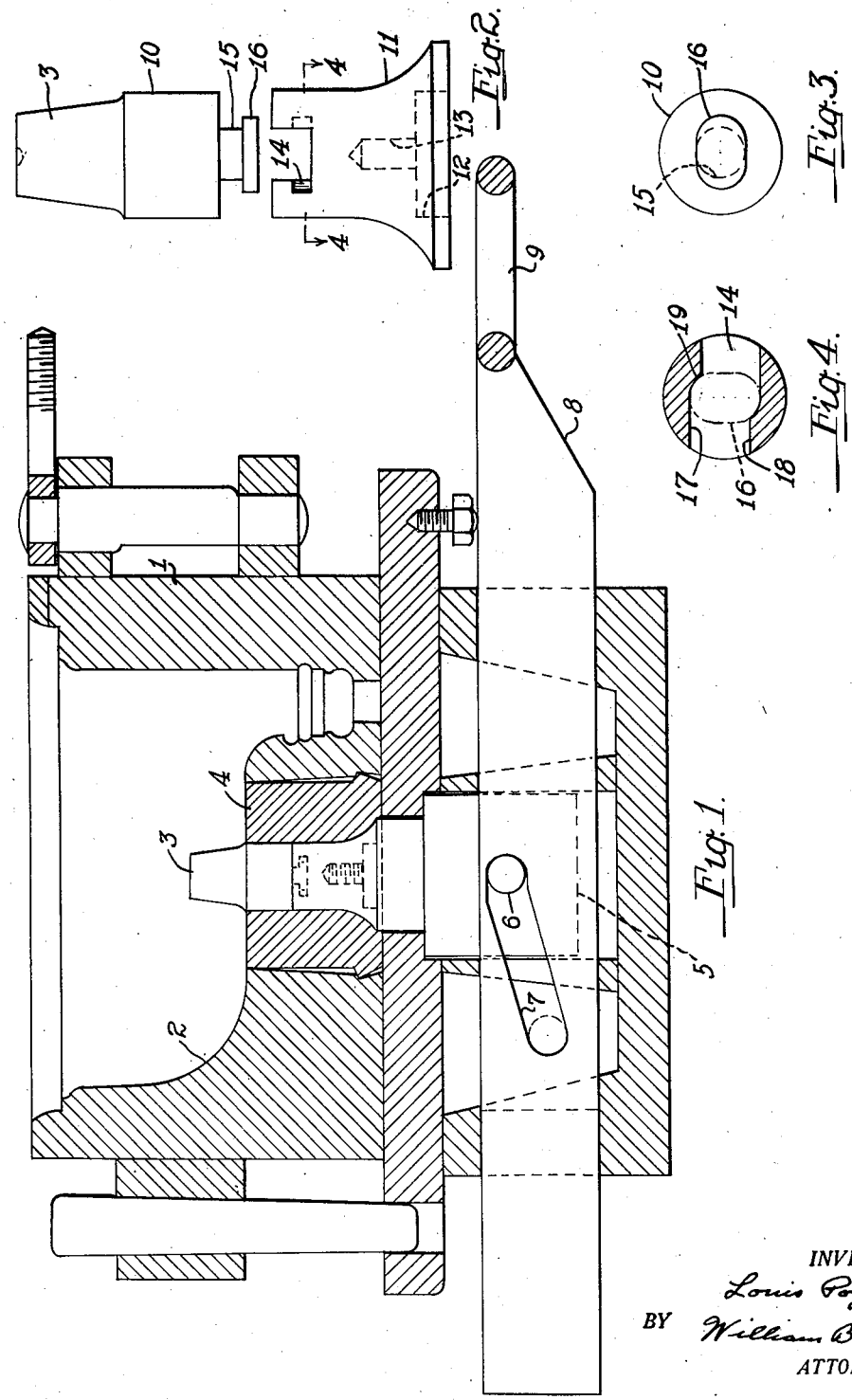
INVENTOR.
Louis Poglein
BY William B. Jaspert
ATTORNEYS.

Patented July 28, 1942

2,291,580

UNITED STATES PATENT OFFICE 2,291,580

REMOVABLE MOLD INSERT

Louis Poglein, Jeannette, Pa., assignor to McKee Glass Company, Jeannette, Pa., a corporation of Pennsylvania Application January 10, 1938, Serial No. 184,220

1 Claim. (Cl. 49—76)

This invention relates to new and useful improvements in molds for making glassware and more particularly to mold inserts for forming perforations or shapes in the formed article.

In the production of glass articles by machine methods, the rate of production is so great as to require artificial cooling of molds and mold parts and in some instances it is necessary to direct the blower over certain portions of the molds which often results in damage by impact of the blower nozzle with the mold piece. Furthermore, where there are a multiple of operations that simultaneously require special cooling of this nature, there is a great drain on the cooling air system, to the detriment of other operating parts elsewhere in the plant.

In accordance with the preesnt invention, the necessity for cooling specific mold parts, such as inserts and the like, is dispensed with by designing such parts to be readily removable from the mold for replacement by other similar parts that are sufficiently cool for the molding operation, and it is among the objects of the invention to provide means for assembling and dismembering mold inserts without interrupting or retarding the normal molding cycle and without necessitating the use of specific applications of cooling air to such parts.

These and other objects of the invention will become more apparent in connection with the description of the accompanying drawing constituting a part hereof in which like reference characters designate like parts and in which:

Fig. 1 is a vertical cross-sectional view of a mold for making glassware;

Fig. 2 an exploded view in side elevation of a mold insert embodying the principles of this invention;

Fig. 3 a bottom plan view of the upper section of the insert member of Fig. 2; and Fig. 4 is a cross-section through the slotted portion of the base of the insert member of Fig. 2 taken along the line 4—4 of Fig. 2.

In the drawing, numeral 1 designates a mold having a matrix portion 2, the particular shape of which, as shown, being for what is known as a "juicer bowl" which is provided with a central opening that is formed by a peg 3 which is an insert portion of the mold and which extends through a hub 4. The peg 3 is secured to a plug 5, having a pin 6 extending therethrough, which engages a slot 7 of a bifurcated draw bar 8, having a handle portion 9, the slot 7 being inclined as shown, whereby when the bar is retracted from the position shown in Fig. 1, slot 7 by its engagement with pin 6 will pull plug 5 and the connected peg downwardly out of the mold. When the bar is pushed forward, the peg 3 will re-enter the mold to the position as shown.

In accordance with the present invention, the peg 3 is made of an upper and lower section 10 and 11, respectively, the base portion 11 having a counterbore 12 with a screw threaded center 13 by means of which it is attached to the plug 5. The upper section 10 is detachably mounted on the lower section 11 by means of the following mechanism.

The base portion 11 is provided with an off-set slot 14, Fig. 4, and the upper section is provided with a shank 15 having a flanged end 16 of substantially elliptical form as shown in Fig. 3 of the drawing. The flanged portion 16 of shank 15 is of the same dimension along the vertical axis of Fig. 3 as the space between the parallel walls 17 and 18 of slot 14, and the dimension of the flanged end 16 on the horizontal axis when viewed in Fig. 3 being the same as the slot 14 at the vertical centerline of Fig. 4. By inserting the shank 15 in the slot 14 with the minor axis of the flanged end 16 disposed in alignment with the slot 14 and rotating the upper section 10 a quarter turn or through an angle of ninety degrees, when it is centered with the base section 11, the major axis of the flanged end 16 will be disposed as shown in dotted lines in Fig. 4 of the drawing, and the curved surface of the flanged end 16 will wedge against the shoulders 19 of the slot 14 to frictionally engage the top and bottom element, which thus become interlocked.

The operation of the insert member is briefly as follows: Assuming the base member 11 to be mounted on the vertically movable plug 5 and the mold otherwise ready for a charge of molten glass, the upper insert section 10 of peg 3 is dropped in the central opening of the hub 4 with the major axis of flange 16 parallel to the axis of slot 14. By rotating the upper section ninety degrees, the flange 16 will interlock with the off-set portions of slot 14 and peg 3 will be in proper position for the molding operation. After the mold charge is placed in the matrix portion of the mold and the glass is formed to the shape of the mold contour, the bar 8 is retracted and plug 3 drops out of contact with the formed glass article, which is then removed from the mold.

At the completion of each molding operation, plug 3 is red hot and if only one plug were employed as heretofore, cooled air would have to be applied to the plug and the mold would remain idle during the cooling period. By means of the removable peg 3, a cooled plug is inserted immediately after completion of the molding operation and the mold is at once available for another charge of molten glass. Copper faced pincers are employed for engaging the pegs 3 to avoid damage to the surface thereof, and to permit handling the pegs while they are red hot a set of eight or ten pegs are employed with a single mold, which gives them sufficient time between successive molding operations to cool in the normal room atmosphere without need for artificial cooling means.

It is apparent that only one of the base sections 11 is required for use with a multiple of the top pegs 3 which makes the use of the removable pegs relatively inexpensive.

Although one embodiment of the invention has been herein illustrated and described, it will be evident to those skilled in the art that various modifications may be made in the details of construction without departing from the principles herein set forth.

I claim:

In a mold a removable center insert comprising a base portion and a top portion, the base portion being secured in the mold and having a transverse slot in the top thereof, each wall of the slot being undercut for a portion of its length, the undercut portion of one wall extending from one end of the slot to the center thereof and the undercut portion of the other wall extending from the other end of the slot to the center thereof, the top portion of said insert having a substantially elliptical shank with its minor axis of the width of the slot and the major axis of the width of the undercut portions of the slot at the center of the slot, said shank being undercut at the ends to provide locking tongues for engaging the undercut portions of the walls of the slot when subjected to angular movement.

LOUIS POGLEIN.